(No Model.)

W. CORLISS.
WHEEL TIRE.

No. 569,370.      Patented Oct. 13, 1896.

WITNESSES:
M. F. Bligh
Chas. H. Luther Jr.

INVENTOR:
William Corliss,
by Joseph A. Miller & Co.,
Attys.

UNITED STATES PATENT OFFICE.

WILLIAM CORLISS, OF PROVIDENCE, RHODE ISLAND.

WHEEL-TIRE.

SPECIFICATION forming part of Letters Patent No. 569,370, dated October 13, 1896.

Application filed December 11, 1895. Serial No. 571,819. (No model.)

*To all whom it may concern:*

Be it known that I, WILLIAM CORLISS, of the city and county of Providence and State of Rhode Island, have invented a new and useful Improvement in Wheel-Tires; and I hereby declare that the following is a full, clear, and exact description of the same, reference being had to the accompanying drawings, forming part of this specification.

This invention has reference to an improvement in the tires of wheels for carriages, bicycles, and other vehicles.

The object of the invention is to support the wheel and thereby the carriage or vehicle on a series of springs secured to and projecting from the rim of the wheel, so that the wheel will yield to any irregularity of the road and cushion any sudden shocks.

Another object of the invention is to limit the flexible movement of the springs and thereby prevent injury to the springs; and another object of the invention is to so construct the springs and their support that they may be readily attached to the rims of the wheels.

The invention consists in the peculiar and novel construction of the spring-tire, as will be more fully set forth hereinafter and more particularly pointed out in the claims.

Figure 1:
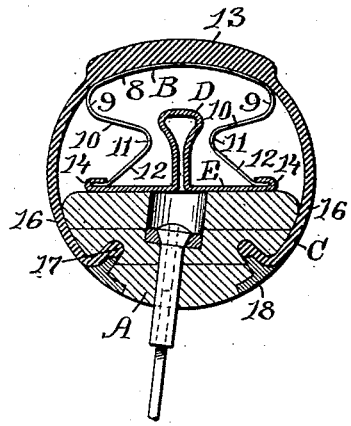
Figure 2:
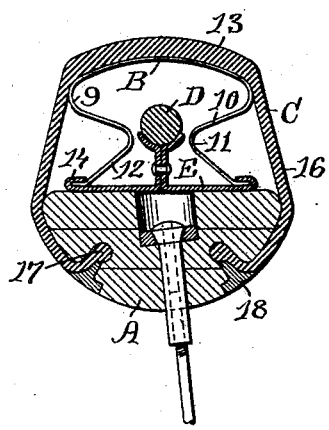
Figure 3:
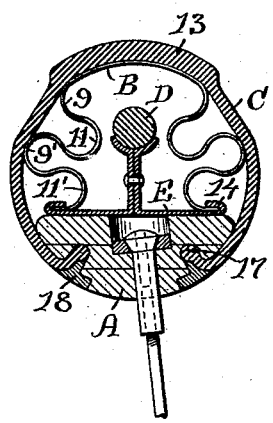
Figure 4:
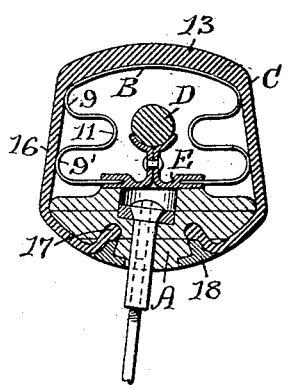
Figure 5:
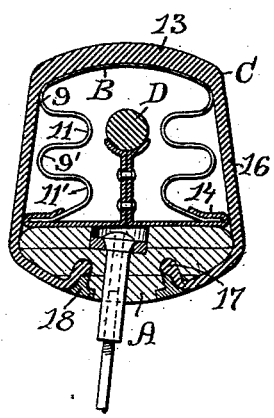
Figure 6:
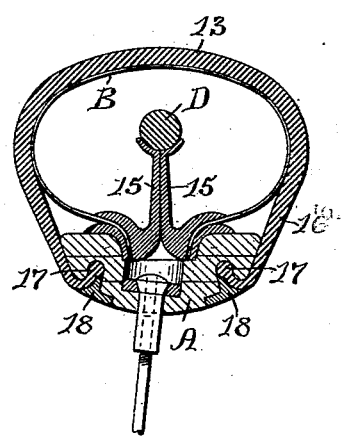
Figure 7:
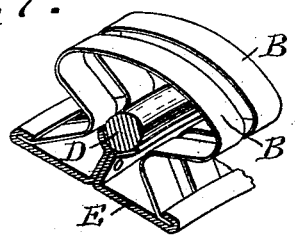

Figure 1 is a transverse section of a wheel-rim provided with a spring-cushioned elastic tire in which the plate supporting the springs is bent to form a stop limiting the compression of the spring. Fig. 2 is a transverse sectional view of a modified form of the tire shown in Fig. 1. Fig. 3 is a sectional view of a wheel-tire provided with springs crimped so as to secure greater length and flexibility. Figs. 4 and 5 are sectional views showing modified forms of crimped springs used in connection with a flexible envelop to form wheel-tires. Fig. 6 is a transverse sectional view of a spring-tire in which the springs fill out and support the flexible envelop more completely. Fig. 7 is a perspective view showing the springs and the supporting-plate of the tire shown in Fig. 2.

In the figures the rims of the wheels are shown in the form adapted for use in bicycles, but the elastic tires are all adapted for use on wheels for carriages or other vehicles.

In the drawings, A indicates the rim of the wheel, which may be of any desired cross-section; B, one of a series of springs—these springs are always placed transversely to the tread of the rim and the tire of the wheel and close together, so that the space between two adjacent springs is less than the width of the springs, as is shown in Fig. 7—C, the envelop, made preferably of rubber or other elastic material or of some textile material impregnated with or covered with some elastic material.

D indicates stops, preferably cushioned with some elastic material, by which stops the compression of the springs is limited and the breaking or distorting of the springs by a sudden blow prevented.

The springs B are secured to the plate E, which is preferably made into a continuous ring inclosing the rim A, to which it is secured.

The above description is common to all the figures with the exception of Fig. 6, in which the spring B is shown secured to the base of a somewhat different construction.

Referring now to Fig. 1, the spring B, which is in all respects like the springs B B in Figs. 2 and 7, has the arched bearing-center 8, terminating on each side in the short curves 9, from which the spring extends inward on the inclines 10, which terminate in the curves 11, after which the spring extends outward on the inclines 12 to form the base and support of the spring by entering the ends of the springs into the bent-over edges 14 of the plate or ring E. By this construction considerable elasticity is secured by a comparatively short spring, and each side of the arched bearing-center 8, which forms the support of the tread 13 of the tire, may be depressed independent of the other side. The short curves 9 9 and 11 11 materially increase the elasticity of the spring and the independent flexible movement of each side of the tire, whereby the tire yields more readily to small obstructions in the road.

To secure still greater flexibility, I bend the springs B so as to form a number of short bends, as is shown in Fig. 4, where the additional bends 9' and 11' are made in each end of the spring B.

In Fig. 3 the springs B are shown bent so as to give nearly a cylindrical form to the envelop, and the springs are bent so as to have on each side the short bends 9, 11, 9', and 11'.

The spring B, as shown in Fig. 6, is secured in the central support 15 for the stop D. This support is preferably made in two parts, each part preferably forming a ring, but this spring may be secured in a plate E similar to the plate E shown in Fig. 4.

The envelop C is preferably made thicker at the tread 13, where it bears on the road, than on the sides 16. As the springs are placed close together the tread 13 forms a yielding support, so that each spring may yield to small irregularities of the road and coöperate to support the load. By the use of the succession of independent transverse springs a noiseless elastic tire is secured that will yieldingly support the wheel and load and adapt itself to any irregularity of the road-bed. The springs can be made of such strength and temper as will adapt them to support any load desired, and when the envelop is torn, punctured, or partly worn the elastic tire will still be serviceable, and a vehicle provided with these tires will be adapted for any hard service without the danger of a collapse incident to a pneumatic tire.

The edges of the envelop C may be secured to the rim in any suitable manner now used with pneumatic tires. The method shown in the drawings consists in placing the edges 17 into a groove formed in the rim and securing the same by means of the strips 18, which in the preferred form are made into rings and are sprung into the recesses made to receive them.

The elastic cushion forming the stop D is shown of circular cross-section. It may be of any other desired cross-section and is preferably made into an endless ring, so that it can be sprung onto the support and held in place by its elasticity.

Having thus described my invention, I claim as new and desire to secure by Letters Patent—

1. In a wheel-tire the combination with the wheel-rim, the plate E and the stop D, of a series of independent springs B the ends of which are secured to the opposite sides of the plate E, adapted to form a spring-cushioned bearing for the wheel in which the compression of the spring is limited, as and for the purpose described.

2. In a wheel-tire the combination with the wheel-rim of the plate E formed into a ring adapted to inclose the rim, the stop D, a series of independent springs B the ends of which are secured to the opposite edges of the plate E, and the envelop C; the whole constructed to form a cushioned bearing for a wheel in which a series of transverse springs are interposed between the outer surface of the wheel-rim and the inner surface of the envelop, as described.

3. In combination an envelop having the thickened tread-bearing 13 and the sides 16, the plate E, the stop D, and the series of transverse springs B the ends of which are secured to the plate E, whereby a cushioned spring-bearing is formed, adapted to be secured to the rim of a wheel, as and for the purpose described.

4. In a wheel-tire the combination with the wheel-rim, a plate encircling the wheel-rim, a series of independent transverse springs each having the arched bearing-center 8, the curves 9 9 and 11 11, the ends of the springs secured to the plate E, and an envelop the sides of which are secured to the wheel-rim, whereby a spring-cushioned bearing inclosed in an envelop is interposed between the wheel-rim and the road, as described.

In witness whereof I have hereunto set my hand.

WILLIAM CORLISS.

Witnesses:
JOSEPH A. MILLER,
JOSEPH A. MILLER, Jr.